United States Patent
Malkes et al.

(10) Patent No.: US 11,100,336 B2
(45) Date of Patent: Aug. 24, 2021

(54) SYSTEM AND METHOD OF ADAPTIVE TRAFFIC MANAGEMENT AT AN INTERSECTION

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: CUBIC CORPORATION, San Diego, CA (US)

(*) Notice: Subject to any disclaimer, the term of this patent is extended or adjusted under 35 U.S.C. 154(b) by 0 days.

(21) Appl. No.: 16/058,214

(22) Filed: Aug. 8, 2018

(65) Prior Publication Data

US 2019/0050647 A1  Feb. 14, 2019

Related U.S. Application Data

(60) Provisional application No. 62/545,268, filed on Aug. 14, 2017.

(51) Int. Cl.
*G08G 1/04* (2006.01)
*G06K 9/00* (2006.01)
*G06K 9/62* (2006.01)

(52) U.S. Cl.
CPC ..... *G06K 9/00785* (2013.01); *G06K 9/00778* (2013.01); *G08G 1/04* (2013.01); *G06K 9/6254* (2013.01); *G06K 9/6268* (2013.01)

(58) Field of Classification Search
CPC .......... G06K 9/00785; G06K 9/00778; G06K 9/6254; G06K 9/6268
(Continued)

(56) References Cited

U.S. PATENT DOCUMENTS 4,833,469 A   5/1989   David
5,111,401 A   5/1992   Everett et al.
(Continued)

FOREIGN PATENT DOCUMENTS

CN   100533151   8/2009
CN   101799987   8/2010
(Continued)

OTHER PUBLICATIONS

U.S. Appl. No. 16/030,396 Office Action dated Nov. 20, 2018.
(Continued)

*Primary Examiner* — Michael E Teitelbaum
*Assistant Examiner* — Omer Khalid
(74) *Attorney, Agent, or Firm* — Kilpatrick Townsend & Stockton, LLP

(57) ABSTRACT

A traffic control system and a method of automatic zone creation for a smart traffic camera to be used in adaptive traffic management at an intersection are disclosed. In one aspect of the present disclosure, a method includes receiving traffic data at an intersection; creating zones at the intersection to be applied to one or more smart traffic cameras installed at the intersection; determining whether the zones are to be validated; validating the zones upon determining that the zones are to be validated; and applying the validated zones to the one or more smart traffic cameras at the intersection.

20 Claims, 12 Drawing Sheets

(58) Field of Classification Search
USPC .......................................................... 348/149
See application file for complete search history.

(56) References Cited

U.S. PATENT DOCUMENTS

| | | | |
|---|---|---|---|
| 5,208,584 | A | 5/1993 | Kaye et al. |
| 5,406,490 | A | 4/1995 | Braegas |
| 5,444,442 | A | 8/1995 | Sadakata et al. |
| 6,064,139 | A | 5/2000 | Ozawa et al. |
| 6,075,874 | A | 6/2000 | Higashikubo et al. |
| 6,249,241 | B1* | 6/2001 | Jordan .................... G01S 7/003 342/41 |
| 6,317,058 | B1 | 11/2001 | Lemelson et al. |
| 6,366,219 | B1 | 4/2002 | Hoummady |
| 6,405,132 | B1 | 6/2002 | Breed et al. |
| 6,505,046 | B1 | 1/2003 | Baker |
| 6,526,352 | B1 | 2/2003 | Breed et al. |
| 6,720,920 | B2 | 4/2004 | Breed et al. |
| 6,741,926 | B1 | 5/2004 | Zhao et al. |
| 6,751,552 | B1 | 6/2004 | Minelli |
| 6,768,944 | B2 | 7/2004 | Breed et al. |
| 6,862,524 | B1 | 3/2005 | Nagda et al. |
| 6,937,161 | B2 | 8/2005 | Nishimura |
| 7,110,880 | B2 | 9/2006 | Breed et al. |
| 7,610,146 | B2 | 10/2009 | Breed |
| 7,630,806 | B2 | 12/2009 | Breed |
| 7,698,055 | B2 | 4/2010 | Horvitz et al. |
| 7,698,062 | B1 | 4/2010 | McMullen et al. |
| 7,821,421 | B2 | 10/2010 | Tamir et al. |
| 7,835,859 | B2 | 11/2010 | Bill |
| 7,899,611 | B2 | 3/2011 | Downs et al. |
| 7,979,172 | B2 | 7/2011 | Breed |
| 8,050,863 | B2 | 11/2011 | Trepagnier et al. |
| 8,135,505 | B2 | 3/2012 | Vengroff et al. |
| 8,144,947 | B2 | 3/2012 | Kletter |
| 8,212,688 | B2 | 7/2012 | Morioka et al. |
| 8,255,144 | B2 | 8/2012 | Breed et al. |
| 8,373,582 | B2 | 2/2013 | Hoffberg |
| 8,566,029 | B1 | 10/2013 | Lopatenko et al. |
| 8,589,069 | B1 | 11/2013 | Lehman |
| 8,682,812 | B1 | 3/2014 | Ran |
| 8,706,394 | B2 | 4/2014 | Trepagnier et al. |
| 8,825,350 | B1 | 9/2014 | Robinson |
| 8,903,128 | B2 | 12/2014 | Shet et al. |
| 9,043,143 | B2 | 5/2015 | Han |
| 9,387,928 | B1 | 7/2016 | Gentry et al. |
| 9,965,951 | B1 | 5/2018 | Gallagher et al. |
| 2004/0155811 | A1 | 8/2004 | Albero et al. |
| 2005/0187708 | A1 | 8/2005 | Joe et al. |
| 2007/0162372 | A1 | 7/2007 | Anas |
| 2007/0208494 | A1 | 9/2007 | Chapman et al. |
| 2007/0273552 | A1 | 11/2007 | Tischer |
| 2008/0094250 | A1 | 4/2008 | Myr |
| 2008/0195257 | A1 | 8/2008 | Rauch |
| 2009/0048750 | A1 | 2/2009 | Breed |
| 2009/0051568 | A1 | 2/2009 | Corry et al. |
| 2011/0037618 | A1 | 2/2011 | Ginsberg et al. |
| 2011/0205086 | A1* | 8/2011 | Lamprecht ............. G08G 1/087 340/928 |
| 2012/0038490 | A1 | 2/2012 | Verfuerth |
| 2012/0112928 | A1 | 5/2012 | Nishimura et al. |
| 2012/0307065 | A1* | 12/2012 | Mimeault ............... G01S 17/04 348/149 |
| 2014/0136414 | A1 | 5/2014 | Abhyanker |
| 2014/0159925 | A1* | 6/2014 | Mimeault ............... G08G 1/054 340/935 |
| 2014/0277986 | A1 | 9/2014 | Mahler et al. |
| 2016/0027299 | A1* | 1/2016 | Raamot ................ G08G 1/0145 340/917 |
| 2017/0089717 | A1* | 3/2017 | White ................ G01C 21/3492 |
| 2017/0169309 | A1 | 6/2017 | Reddy et al. |
| 2018/0075739 | A1 | 3/2018 | Ginsberg et al. |
| 2018/0190111 | A1* | 7/2018 | Green ...................... G08G 1/04 |
| 2019/0035263 | A1* | 1/2019 | Loes ...................... G08G 1/095 |
| 2019/0049264 | A1 | 2/2019 | Malkes |
| 2019/0051152 | A1 | 2/2019 | Malkes |
| 2019/0051160 | A1 | 2/2019 | Malkes |
| 2019/0051161 | A1 | 2/2019 | Malkes |
| 2019/0051162 | A1 | 2/2019 | Malkes |
| 2019/0051163 | A1 | 2/2019 | Malkes |
| 2019/0051164 | A1 | 2/2019 | Malkes |
| 2019/0051167 | A1 | 2/2019 | Malkes |
| 2019/0051171 | A1 | 2/2019 | Malkes |

FOREIGN PATENT DOCUMENTS

| | | |
|---|---|---|
| CN | 101944295 | 1/2011 |
| EP | 0 464 821 | 1/1992 |
| KR | 2013-0067847 | 6/2013 |

OTHER PUBLICATIONS

U.S. Appl. No. 16/058,343 Office Action dated Nov. 19, 2018.
Dehghan et al., Afshin; "Automatic Detection and Tracking of Pedestrians in Videos with Various Crowd Densities", Pedestrian and Evacuation Dynamics 2012.
Dubska et al.; "Automatic Camera Calibration for Traffic Understanding", bmva.org, 2014.
Grosser, Kari; "Smart Io T Technologies for Adaptive Traffic Management Using a Wireless Mes Sensor Network", Advantech Industrial Io T Blog, Feb. 3, 2017.
https://www.flir.com, 2018.
Halper, Mark; Smart Cameras Will Help Spokane Light It's World More Intelligently (Updated), LEDs Magazine, and Business/Energy/Technology Journalist, Apr. 19, 2017.
Heaton, Brian; "Smart Traffic Signals Get a Green Light", Government Technology Magazine, Feb. 15, 2012.
Kolodny, Lora; Luminar reveals sensors that could make self-driving cars safer than human, Techcrunch, Apr. 13, 2017.
McDermott, John; "Google's newest secret weaon for local ads", Digiday, Jan. 29, 2014.
Resnick, Jim; "How Smart Traffic Signals May Ease Your Commute", BBC, Autos, Mar. 18, 2015.
Sun et al., M.; "Relating Things and Stuff via Object Property Interactions", cvgl.stanford.edu, Sep. 4, 2012.
Whitwam, Ryan; "How Google's self-driving cars detect and avoid obstacles", ExtremeTech, Sep. 8, 2014.
Yamaguchi, Jun'ichi; "Three Dimensional Measurement Using Fisheye Stereo Vision", Advances in Theory and Applications of Stereo Vision, Dr. Asim Bhatti (Ed.), ISBN:978-953-307-516-7, InTech. Jan. 8, 2011.
U.S. Appl. No. 16/030,396, William A. Malkes, System and Method Adaptive Controlling of Traffic Using Camera Data, filed Jul. 9, 2018.
U.S. Appl. No. 16/044,891, William A. Malkes, System and Method for Controlling Vehicular Traffic, filed Jul. 25, 2018.
U.S. Appl. No. 16/032,886, William A. Malkes, Adaptive Traffic Control Using Object Tracking and Identity Details, filed Jul. 11, 2018.
U.S. Appl. No. 16/058,106, William A. Malkes, System and Method for Managing Traffic by Providing Recommendations to Connected Objects, filed Aug. 8, 2018.
U.S. Appl. No. 16/059,814, William A. Malkes, Systems and Methods of Navigating Vehicles, filed Aug. 9, 2018.
U.S. Appl. No. 16/059,886, William A. Malkes, System and Method of Adaptive Traffic Optimization Using Unmanned Aerial Vehicles, filed Aug. 9, 2018.
U.S. Appl. No. 16/100,750, William A. Malkes, System and Method of Adaptive Traffic Management at an Intersection, filed Aug. 10, 2018.
U.S. Appl. No. 16/101,766, William A. Malkes, System and Method for Retail Revenue Based Traffic Management, filed Aug. 10, 2018.
U.S. Appl. No. 16/101,933, William A. Malkes, Adaptive Optimization of Navigational Routes Using Traffic Data, filed Aug. 13, 2018.

(56) References Cited

OTHER PUBLICATIONS

U.S. Appl. No. 16/058,343, William A. Malkes, System and Method of Adaptive Controlling of Traffic Using Zone Based Occupancy, filed Aug. 8, 2018.

* cited by examiner

| Intersection IA₁ | Zone 1a | | Zone 1b | | Zone 2b | | Zone 3a | | Zone N2 | |
|---|---|---|---|---|---|---|---|---|---|---|
| Time Interval | Traffic Flow Rate | Number of Vehicles | Traffic Flow Rate | Number of Vehicles | Traffic Flow Rate | Number of Vehicles | Traffic Flow Rate | Number of Vehicles | Traffic Flow Rate | Number of Vehicles |
| 1 | 10 | 55 | 11 | 55 | 10 | 55 | 9 | 43 | 10 | 55 |
| 2 | 10 | 50 | 9 | 45 | 10 | 50 | 9 | 45 | 10 | 50 |
| 3 | 10 | 53 | 11 | 54 | 10 | 53 | 9 | 47 | 10 | 53 |
| 4 | 11 | 52 | 11 | 54 | 11 | 52 | 9 | 46 | 11 | 52 |
| ... | ... | ... | ... | ... | ... | ... | ... | ... | ... | ... |
| 24 | 9 | 25 | 10 | 50 | 5 | 27 | 9 | 45 | 5 | 10 |
| Averages | 10 | 47 | 10.4 | 51.6 | 9.5 | 47.4 | 9 | 45.2 | 9.2 | 47 |

| Intersection IA₁ | Zone 1a | | | Zone 1b | | | Zone 2a | | | Zone 2b | | | ... | Zone Nx | | |
|---|---|---|---|---|---|---|---|---|---|---|---|---|---|---|---|---|
| Time Interval | Width x Length (ft) | Zone coordinates (x,y) | | Width x Length | Zone coordinates (x,y) | | Width x Length | Zone coordinates (x,y) | | Width x Length | Zone coordinates (x,y) | | | Width x Length | Zone coordinates (x,y) | |
| | 6x20 | 2,0 | | 6x15 | -3,1.5 | | 6x10 | -0.5, 5.5 | | 6x12 | 1.5, 5.5 | | | 6x30 | x,y | |
| | Traffic Flow Rate | Number of Vehicles | | Traffic Flow Rate | Number of Vehicles | | Traffic Flow Rate | Number of Vehicles | | Traffic Flow Rate | Number of Vehicles | | | Traffic Flow Rate | Number of Vehicles | |
| 1 | 10 | 55 | | 11 | 55 | | 9 | 43 | | 10 | 55 | | ... | 10 | 55 | |
| 2 | 10 | 50 | | 9 | 45 | | 9 | 45 | | 10 | 50 | | ... | 10 | 50 | |
| 3 | 10 | 53 | | 11 | 54 | | 9 | 47 | | 10 | 53 | | ... | 10 | 53 | |
| 4 | 11 | 52 | | 11 | 54 | | 9 | 46 | | 11 | 52 | | ... | 11 | 52 | |
| ... | ... | ... | | ... | ... | | ... | ... | | ... | ... | | ... | ... | ... | |
| 24 | 9 | 25 | | 10 | 50 | | 9 | 45 | | 5 | 27 | | ... | 5 | 10 | |
| Averages | 10 | 47 | | 10.4 | 51.6 | | 9 | 45.2 | | 6.5 | 47.4 | | | 10 | 47 | |

| Intersection images | Intersection type | Zone Label | Traffic flow rate | Dimension | Location – x,y coordinates |
|---|---|---|---|---|---|
| | A | 1a | 5 | 6 x 10 | -2, 0 |
| | A | 1a | 6 | 6 x 10 | -2, 0 |
| | A | 1a | 7 | 6 x 13 | -2, 0 |
| | A | 1a | 8 | 6 x 14 | -2, 0 |
| ... | ... | ... | ... | ... | ... |
| | A | 1a | 25 | 6 x 30 | -1, 0 |
| | A | 1b | 5 | 5 x 10 | -3, 1.5 |
| | A | 1b | 6 | 5 x 11 | -3, 1.5 |
| ... | ... | ... | ... | ... | ... |
| | B | 1a | 5 | 7 x 15 | -2, -1 |
| | B | 1a | 6 | 7 x 15 | -2, -1 |

SYSTEM AND METHOD OF ADAPTIVE TRAFFIC MANAGEMENT AT AN INTERSECTION

CROSS-REFERENCE TO RELATED APPLICATIONS

This application claims priority to U.S. Provisional Patent Application No. 62/545,268 filed on Aug. 14, 2017, the entire content of which is incorporated herein by reference.

BACKGROUND

Field of the Disclosure

The present disclosure is generally related to traffic control systems, and more particularly related to adaptive traffic management at an intersection through automatic creation and management of detection zones.

Description of the Related Art

Control of vehicular traffic on roads is essential for transportation of persons and goods. Typically, the vehicular traffic is managed by traffic control systems. Generally, traffic signals, comprising different color and/or shapes of lights, are mounted on poles or span wires at the intersection. These traffic signals are used to regulate the movement of traffic through the intersection by turning on and off their different signal lights. These signals, together with the equipment that turns on and off their different lights, comprise a traffic control system. Also, video detection systems are present at the traffic lights.

Currently, the video detection systems are used for capturing video of the traffic at the intersection. However, each and every intersection does not have the video detection systems. Also, the video detection systems require users to create "zones" at the intersection for managing the traffic. The zones are created to detect the presence of vehicles and/or travelers in different regions in the road, including entering, exiting, and approaching the intersection. However, such manual operation to create the zones may be a cumbersome task for the users and may be inappropriate.

Thus, the current state of art is costly and requires error-prone user interaction for creating the zones, and thus lacks an efficient mechanism to adaptively manage the traffic in different conditions. Therefore, there is a need for an improved system that may perform adaptive traffic management at the intersection.

SUMMARY

One or more example embodiments of inventive concepts are directed to providing adaptive traffic control mechanisms at an intersection (or a group of intersections in vicinity of each other) based on dynamic creation and management of detection zones.

One aspect of the present disclosure is a method including receiving traffic data at an intersection; creating zones at the intersection to be applied to one or more smart traffic cameras installed at the intersection; determining whether the zones are to be validated; validating the zones upon determining that the zones are to be validated; and applying the validated zones to the one or more smart traffic cameras at the intersection.

One aspect of the present disclosure is a traffic controller with memory having computer-readable instructions stored thereon and one or more processors. The one or more processors are configured to execute the computer-readable instructions to receive traffic data at an intersection; create zones at the intersection to be applied to one or more smart traffic cameras installed at the intersection; determine whether the zones are to be validated; validate the zones upon determining that the zones are to be validated; and apply the validated zones to the one or more smart traffic cameras at the intersection.

One aspect of the present disclosure includes one or more computer-readable medium having computer-readable instructions stored thereon, which when executed by one or more processors of a traffic controller, configure the traffic controller to receive traffic data at an intersection; create zones at the intersection to be applied to one or more smart traffic cameras installed at the intersection; determine whether the zones are to be validated; validate the zones upon determining that the zones are to be validated; and apply the validated zones to the one or more smart traffic cameras at the intersection.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIGS. 6A-C illustrate intersection database of FIG. 1;

FIG. 9 illustrates an example zone parameter table stored in the zone selection database.

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Figure 1:
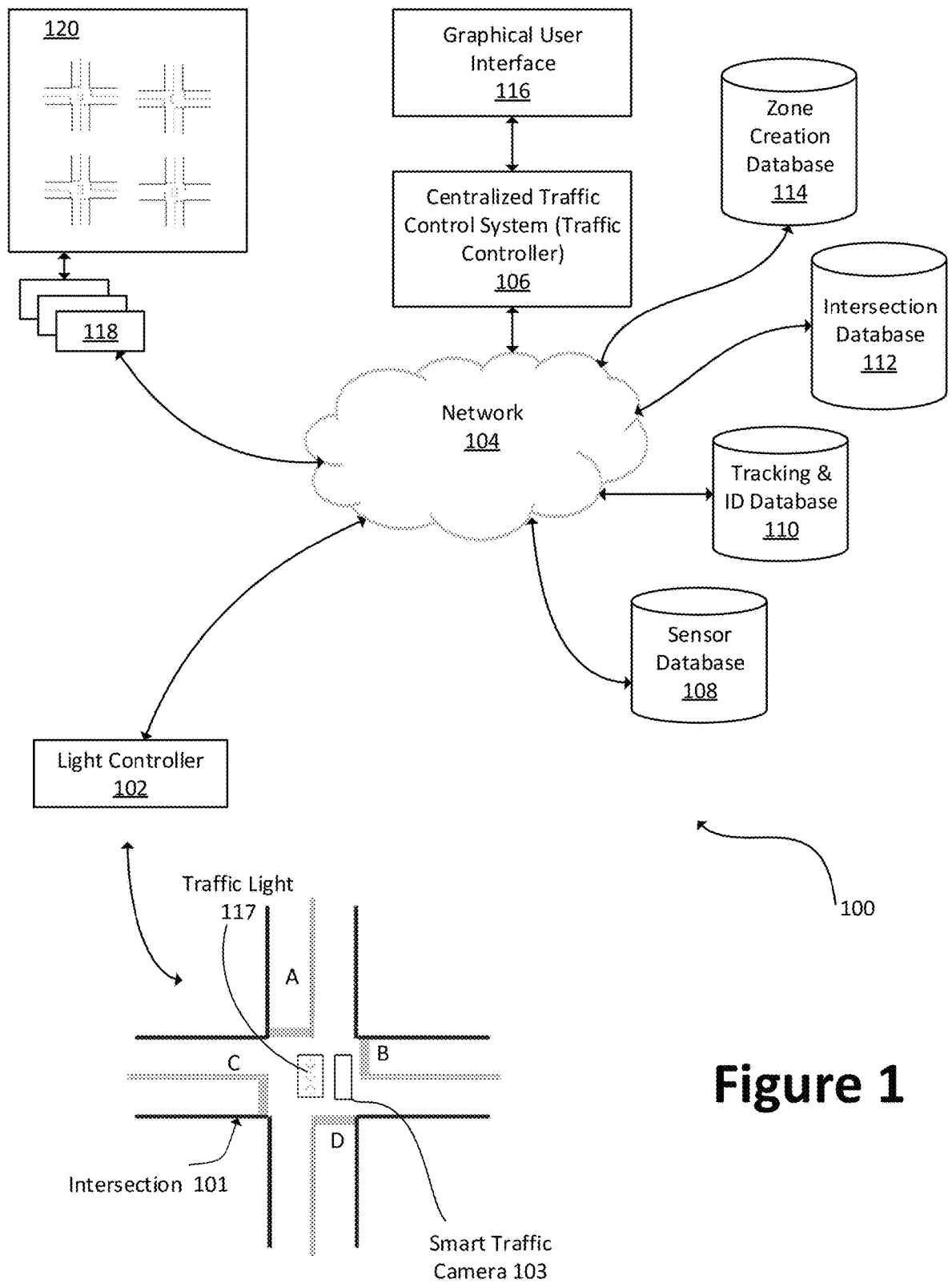
FIG. 1 illustrates a system for adaptive controlling of traffic.

FIG. 1 illustrates a system for adaptive controlling of traffic. The system 100 comprises various components including but not limited to, a traffic light controller 102 (hereinafter may be referred to as a light controller 102) associated with a smart traffic camera 103 and traffic light 117 installed at an intersection 101. Components of the traffic controller 106 will be further described with reference to FIG. 2. The traffic controller 106 may or may not be physically located near the smart traffic camera 103 or the traffic light 117. In one example embodiment, the traffic light 117 associated with the light controller 102 can have different traffic signals directed towards all the roads/zones leading to the intersection 101. The different signals may comprise a Red light, a Yellow light, and a Green light.

There may be more than one smart traffic camera 103 or one traffic light 117 installed at intersection 101. The smart traffic camera 103 may be one of various types of cameras, including but not limited to, fisheye traffic cameras to detect and optimize traffic flows at the intersection 101 and/or at other intersections part of the same local network or corridor. The smart traffic camera 103 can be any combination of cameras or optical sensors, such as but not limited to fish-eye cameras, directional cameras, infrared cameras, etc. The smart traffic camera 103 can allow for other types of sensors to be connected to thereto (e.g., via various known or to be developed wired and/or wireless communication schemes) for additional data collection. The smart traffic camera 103 can collect video and other sensor data at the intersection 101 and convey the same to the traffic controller 106 for further processing, as will be described below.

The light controller 102 can manage and control traffic for all zones (directions) at which traffic enters and exits the intersection 101. Examples of different zones of the intersection 101 are illustrated in FIG. 1 (e.g., zones A, B, C and D). Therefore, while FIG. 1 only depicts a single smart traffic camera 103 and a single traffic light 117, there can be multiple ones of the smart traffic camera 103 and traffic lights 117 installed at the intersection 101 for managing traffic for different zones of the intersection 101.

The system 100 may further include network 104. The network 104 can enable the light controller 102 to communicate with a remote traffic control system 106 (which may be referred to as a centralized traffic control system or simply a traffic controller 106). The network 104 can be any known or to be developed cellular, wireless access network and/or a local area network that enables communication (wired or wireless) among components of the system 100. As mentioned above, the light controller 102 and the traffic controller 106 can communicate via the network 104 to exchange data, created traffic rules or control settings, etc., as will be described below.

The traffic controller 106 can be a centralized system used for managing and controlling traffic lights and conditions at multiple intersections (in a given locality, neighbourhood, an entire town, city, state, etc.).

The traffic controller 106 can be communicatively coupled (e.g., via any known or to be developed wired and/or wireless network connection such as network 104) to one or more databases such as a sensor data database 108, a tracking and ID database 110, an intersection database 112 and a zone creation database 114.

The sensor data database 108 may be configured to store sensor data (obtained via smart traffic camera 103 and/or sensor(s) 306) of traffic at the intersection 101 in a real-time. The sensor data may include video(s) of objects moving across roads. In one case, the sensor data may include video(s) related to the traffic at an intersection. In an example, the sensor data database 108 may store the sensor data of the zones present around the traffic light 117.

The tracking and ID database 110 may be configured to store identity of the objects and tracking data of the objects, present in the sensor data. The tracking data may include types of objects and a count of the objects. The types of objects stored in the tracking and ID database 110 may include, but not limited to, trucks, buses, cars, motorcycles, bicyclists, and pedestrians. The tracking and ID database 110 may further store traffic flow rates associated with the traffic at the intersection 101. The tracking and ID database 110 may also store the count of objects entering and leaving the intersection 101 at different time intervals. The tracking and ID database 110 may also store one or more images related to different intersections. The tracking and ID database 110 may store the traffic flow rates for each zone and route segment for different time intervals. The traffic flow rates for each route may represent calculated traffic flow rates leaving the intersection 101. Further, the tracking and ID database 110 may store time intervals or time periods at which the traffic flow rates are determined The intersection database 112 may be configured to store historical data related to different intersections. The historical data may include locations of zones and dimensions of the zones. In an example, the intersection database 112 may store one or more images for each intersection. For example, the intersection database 112 may store the historical data, and one or more images of each intersection categorized in a category, as will be described below. A single category may include similar types of intersections. The intersection database 112 may store a table having data for each zone at the intersection 101. Such data includes, but is not limited to, time intervals, traffic flow rates, count of the objects for each zone, and dimensions and/or locations of each zone.

The zone creation database 114 may be configured to store information related to the zones the intersection 101. The information may include locations and dimensions of the zones, traffic flow rates associated with each zone, one or more images of intersections, and intersection types such as zone label. In one example, the zone creation database 114 may store one or more parameters associated with each zone. For example, the zone creation database 114 may store the information related to each zone of the intersection 101.

The traffic controller 106 can provide a centralized platform for network operators to view and manage traffic conditions, set traffic control parameters and/or manually override any traffic control mechanisms at any given intersection. An operator can access and use the traffic controller 106 via a corresponding graphical user interface 116 after providing login credentials and authentication of the same by the traffic controller 106. The traffic controller 106 can be controlled, via the graphical user interface 116, by an operator to receive traffic control settings and parameters to apply to one or more designated intersections. The traffic controller 106 can also perform automated and adaptive control of traffic at the intersection 101 or any other associated intersection based on analysis of traffic conditions, data and statistics at a given intersection(s) using various algorithms and computer-readable programs such as known or to be developed machine learning algorithms. The components and operations of traffic controller 106 will be further described below with reference to FIGS. 4-6.

Traffic controller 106 can be a cloud based component running on a public, private and/or a hybrid cloud service/infrastructure provided by one or more cloud service providers.

The system 100 can also have additional intersections and corresponding light controllers associated therewith. Accordingly, not only the traffic controller 106 is capable of adaptively controlling the traffic at an intersection based on traffic data at that particular intersection but it can further adapt traffic control parameters for that particular intersection based on traffic data and statistics at nearby intersections communicatively coupled to the traffic controller 106.

As shown in FIG. 1, the light controllers 118 can be associated with one or more traffic lights at one or more of the intersections 120 and can function in a similar manner as the light controller 102 and receive rules and traffic control settings from the traffic controller 106 for managing traffic at the corresponding one of intersections 120. Alternatively, any one of the light controllers 118 can be a conventional light controller implementing pre-set traffic control settings at the corresponding traffic lights but configured to convey corresponding traffic statistics to the traffic controller 106.

The intersections 120 can be any number of intersections adjacent to the intersection 101, within the same neighbourhood or city as the intersection 101, intersections in another city, etc.

In one or more examples, the light controller 102 and the traffic controller 106 can be the same (one component implementing the functionalities of both). In such example, components of each described below with reference to FIGS. 2 and 3 may be combined into one. Furthermore, in such example, the light controller 102 may be remotely located relative to the smart traffic camera 103 and the traffic light 117 and be communicatively coupled thereto over a communication network such as the network 104.

As mentioned above, the components of the system 100 can communicate with one another using any known or to be developed wired and/or wireless network. For example, for wireless communication, techniques such as Visible Light Communication (VLC), Worldwide Interoperability for Microwave Access (WiMAX), Long Term Evolution (LTE), Fifth Generation (5G) cellular, Wireless Local Area Network (WLAN), Infrared (IR) communication, Public Switched Telephone Network (PSTN), Radio waves, and other communication techniques known, or to be developed, in the art may be utilized.

While certain components of the system 100 are illustrated in FIG. 1, inventive concepts are not limited thereto and the system 100 may include any number of additional components necessary for operation and functionality thereof.

Having described components of an example system 100, the disclosure now turns to description of one or more examples of components of the light controller 102 and the traffic controller 106.

Figure 2:
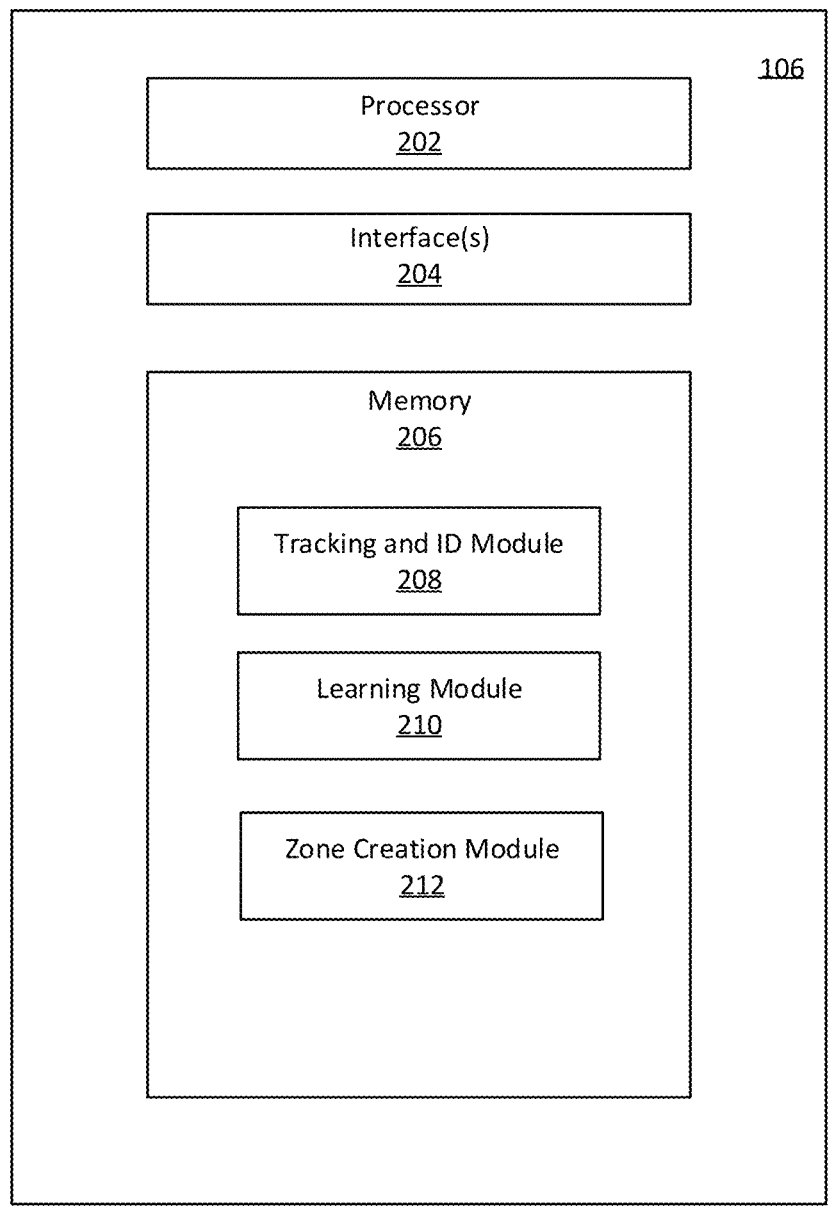
FIG. 2 is a block diagram showing different components of the traffic controller of FIG. 1.

FIG. 2 is a block diagram showing different components of the traffic controller of FIG. 1.

The traffic controller 106 can comprise one or more processors such as a processor 202, interface(s) 204 and one or more memories such as a memory 206. The processor 202 may execute an algorithm stored in the memory 206 for adaptive traffic control based on detection of anomalies, as will be described below. The processor 202 may also be configured to decode and execute any instructions received from one or more other electronic devices or server(s). The processor 202 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 202 may be configured to execute one or more computer-readable program instructions, such as program instructions to carry out any of the functions described in this description.

The interface(s) 204 may assist an operator in interacting with the traffic controller 106. The interface(s) 204 of the traffic controller 106 can be used instead of or in addition to the graphical user interface 116 described above with reference to FIG. 1. In another example, the interface(s) 204 can be the same as the graphical user interface 116. The interface(s) 204 either accept an input from the operator or provide an output to the operator, or may perform both the actions. The interface(s) 204 may either be a Command Line Interface (CLI), Graphical User Interface (GUI), voice interface, and/or any other user interface known in the art or to be developed.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 may include computer-readable instructions, which when executed by the processor 202 cause the traffic controller 106 to perform dynamic detection zone creation and management for adaptive traffic control. The computer-readable instructions stored in the memory 206 can be identified as Tracking and ID module (service) 208, learning module (service) 210 and zone creation module (service) 212. The functionalities of each of these modules, when executed by the processor 202 will be further described below with reference to FIG. 4-10.

Figure 3:
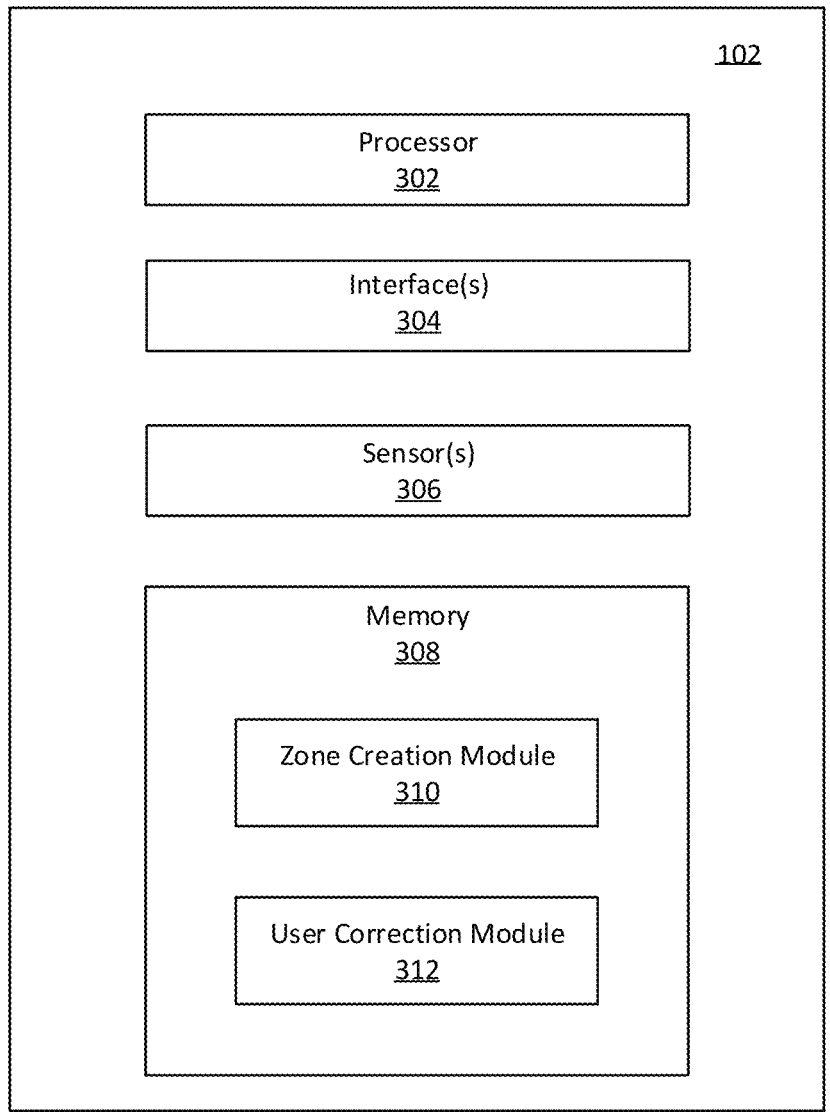
FIG. 3 is a block diagram showing different components of the light controller of FIG. 1.

FIG. 3 is a block diagram showing different components of the light controller of FIG. 1. As mentioned above, the light controller 102 can be physically located near the smart traffic camera 103 and/or the traffic light 117 (e.g., at a corner of the intersection 101) or alternatively can communicate with the smart traffic camera 103 and/or the traffic light 117 wirelessly or via a wired communication scheme (be communicatively coupled thereto).

The light controller 102 can comprise one or more processors such as a processor 302, interface(s) 304, sensor(s) 306, and one or more memories such as a memory 308. The processor 302 may execute an algorithm stored in the memory 308 for adaptive traffic control, as will be described below. The processor 302 may also be configured to decode and execute any instructions received from one or more other electronic devices or server(s). The processor 302 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 302 may be configured to execute one or more computer-readable program instructions, such as program instructions to carry out any of the functions described in this description.

The interface(s) 304 may assist an operator in interacting with the light controller 102. The interface(s) 304 of the light controller 102 may be used instead of or in addition to the graphical user interface 116 described with reference to FIG. 1. In one example, the interface(s) 304 can be the same as the graphical user interface 116. The interface(s) 304 either accept an input from the operator or provide an output to the operator, or may perform both actions. The interface(s) 304 may either be a Command Line Interface (CLI), Graphical User Interface (GUI), voice interface, and/or any other user interface known in the art or to be developed.

The sensor(s) 306 can be one or more smart cameras such as fish-eye cameras mentioned above or any other type of sensor/capturing device that can capture various types of data (e.g., audio/visual data) regarding activities and traffic patterns at the intersection 101. Any one sensor 306 can be located at the intersection 101 and coupled to the traffic controller 106 and/or the traffic light 117.

As mentioned, the sensor(s) 306 may be installed to capture objects moving across the roads. The sensor(s) 306 used may include, but are not limited to, optical sensors such as fish-eye camera mentioned above, Closed Circuit Television (CCTV) camera and Infrared camera. Further, sensor(s) 306 can include, but not limited to induction loops, Light Detection and Ranging (LIDAR), radar/microwave, weather sensors, motion sensors, audio sensors, pneumatic road tubes, magnetic sensors, piezoelectric cable, and weigh-in motion sensor, which may also be used in combination with the optical sensor(s) or alone.

The memory 308 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 308 may include computer-readable instructions, which when executed by the processor 302 cause the light controller 102 to perform dynamic zone creation and management for adaptive traffic control. The computer-readable instructions stored in the memory 206 can be identified as zone detection module (service) 310 and user correction module (service) 312, the functionalities of which, when executed by the processor 302 will be further described below with reference to FIG. 4-10.

As mentioned above, light controller 102 and traffic controller 106 may form a single physical unit, in which case system components of each, as described with reference to FIGS. 1-3 may be combined into one (e.g., all example modules described above with reference to FIGS. 2 and 3 may be stored on a single memory such as the memory 206 or the memory 308).

While certain components have been shown and described with reference to FIGS. 2 and 3, the components of the light controller 102 and/or the traffic controller 106 are not limited thereto, and can include any other component for proper operations thereof including, but not limited to, a transceiver, a power source, etc.

Having described an example system and example components of one or more elements thereof with reference to FIGS. 1-3, the disclosure now turns to the description of examples for creation and management of traffic detection zones at an intersection.

First, example embodiments related to creating a database of various intersections and zones thereof will be described.

Figure 4:
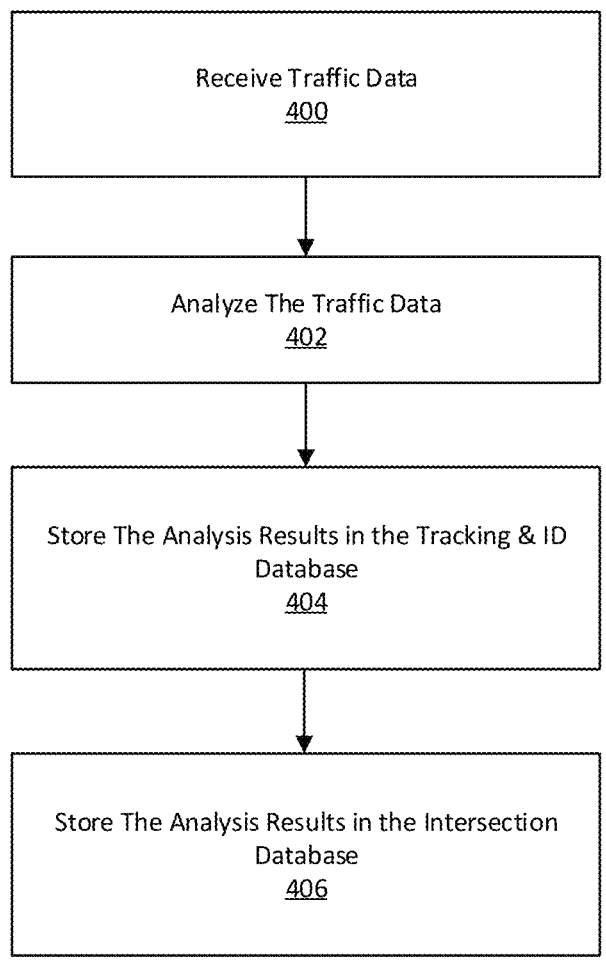
FIG. 4 illustrates a method used for zone detection.

FIG. 4 illustrates a method used for zone detection. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 4 will be described from the perspective of the traffic controller 106. However, it will be understood that the functionalities of the traffic controller 106 are implemented by the processor 202 executing computer-readable instructions stored on the memory 206 described with reference to FIG. 2.

At step 400, the traffic controller 106 may receive traffic data at the intersection 101 captured by smart traffic camera 103 and/or sensor(s) 306 associated therewith. The received traffic data may include an image of the intersection 101.

At step 402, the traffic controller 106 may analyse the traffic data received at step 400. The analysis can be for identification and tracking of objects at the intersection 101, determining vehicle types, traffic flow rate at each zone of the intersection 101, location of existing zones of the intersection 101, light phases and timing at the time of data capture by the smart traffic light 103 and/or sensor(s) 306, etc.

In one example, the traffic controller 106 performs step 402 by implementing computer-readable instructions stored on memory 206 thereof that correspond to the tracking and ID module (service) 208. By execution of computer-readable instructions corresponding to tracking and ID module 208, processor 202 of traffic controller 106 can utilize known or to be developed image/video processing methods for determining the type of vehicles, tracking objects, etc. Objects and vehicles can include any one or more of various types of vehicles, bicycles, motor cycles, humans, autonomous vehicles, etc. Traffic flow rates can also be determined based on the vehicle tracking data according to any known or to be developed method for doing so.

Figure 5:
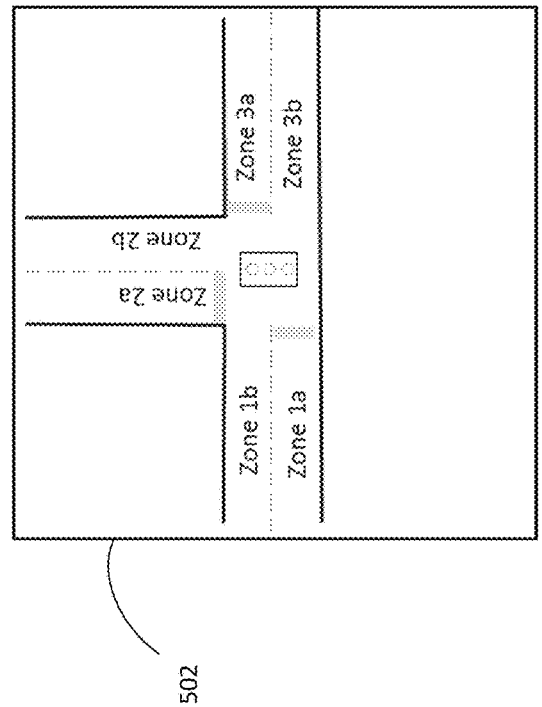
FIG. 5 illustrates an example of results of analysis of traffic data.

FIG. 5 illustrates an example of results of analysis of traffic data. FIG. 5 illustrates the results of analysis of step 402 for various time intervals at the intersection 101. Table 500 includes the analysis result for example intersection 502 that includes example zones 1a, 1b, 2a, 2b, 3a and 3b. Each one of example zones 1a, 1b, 2a, 2b, 3a and 3b can be either an exit zone (through which objects exit the intersection 502) or an entrance zone (through which objects enter or approach the intersection 502). In example of FIG. 5, zones 1*a*, 2*a* and 3*a* are entrance zones while zones 1*b*, 2*b* and 3*b* are exit zones. The entrance zones may also be referred to as detection zones.

Furthermore, Table 500 shows the analysis results for several time intervals (e.g., time interval 1-24), each of which may have a period (e.g., 2 minutes) determined based on experiments and/or empirical studies. Table 500 illustrates corresponding traffic flow rate and number of vehicles for each zone and for each time period as well as corresponding averages. While two example data points (flow rate and number of vehicles) are shown in table 500, the present disclosure is not limited thereto and can include additional information.

At step 404, the traffic controller 106 can store the analysis results (e.g., table 500) in the tracking and ID database 110.

At step 406, the traffic controller 106 can store image(s) of the intersection (e.g., intersection 502 of FIG. 5 or the intersection 101 of FIG. 1) together with the corresponding analysis result in the intersection database 112.

In one example, steps 404 and 406 may be performed simultaneously.

Figure 6A:
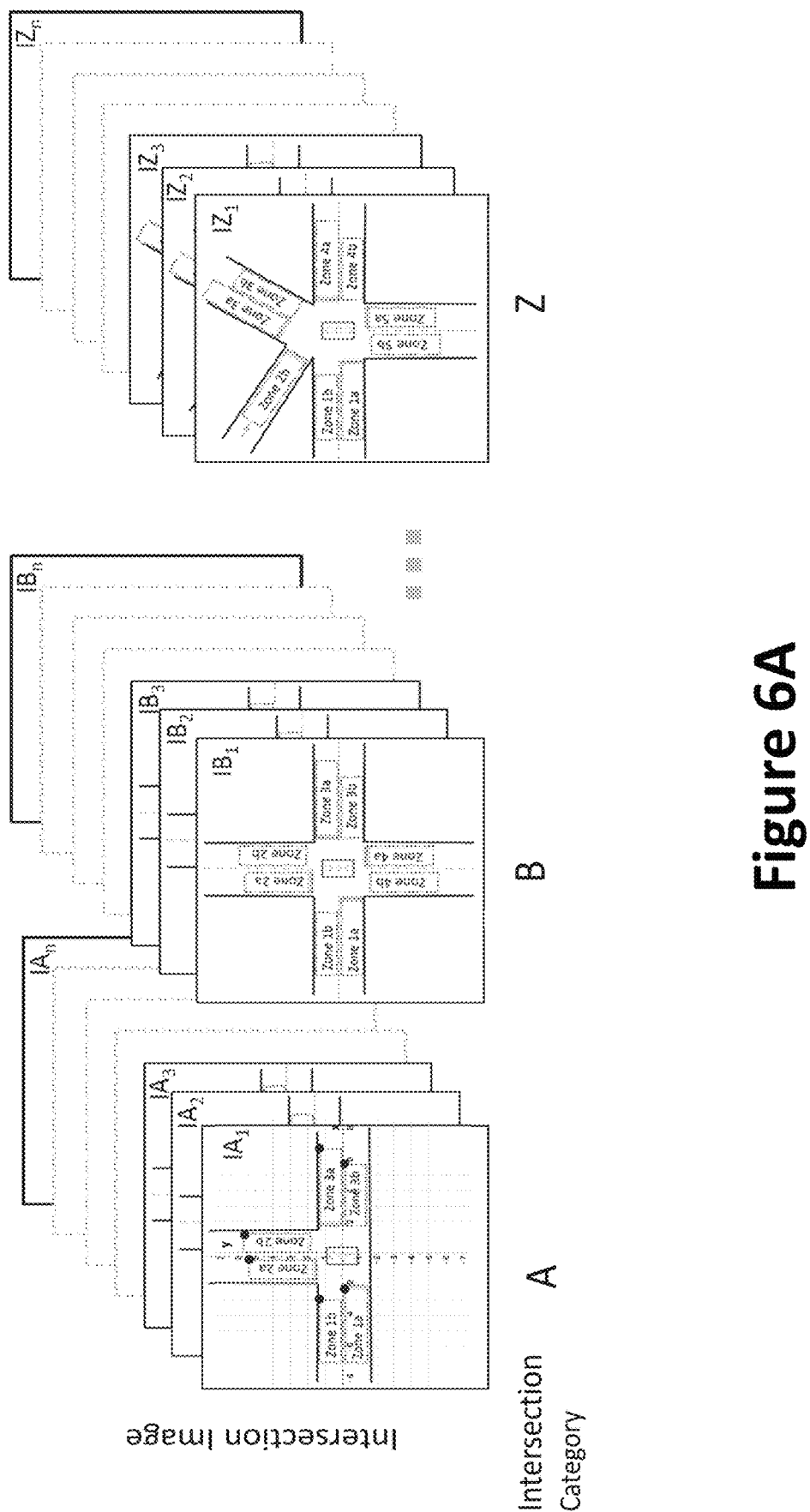
Figure 6B:
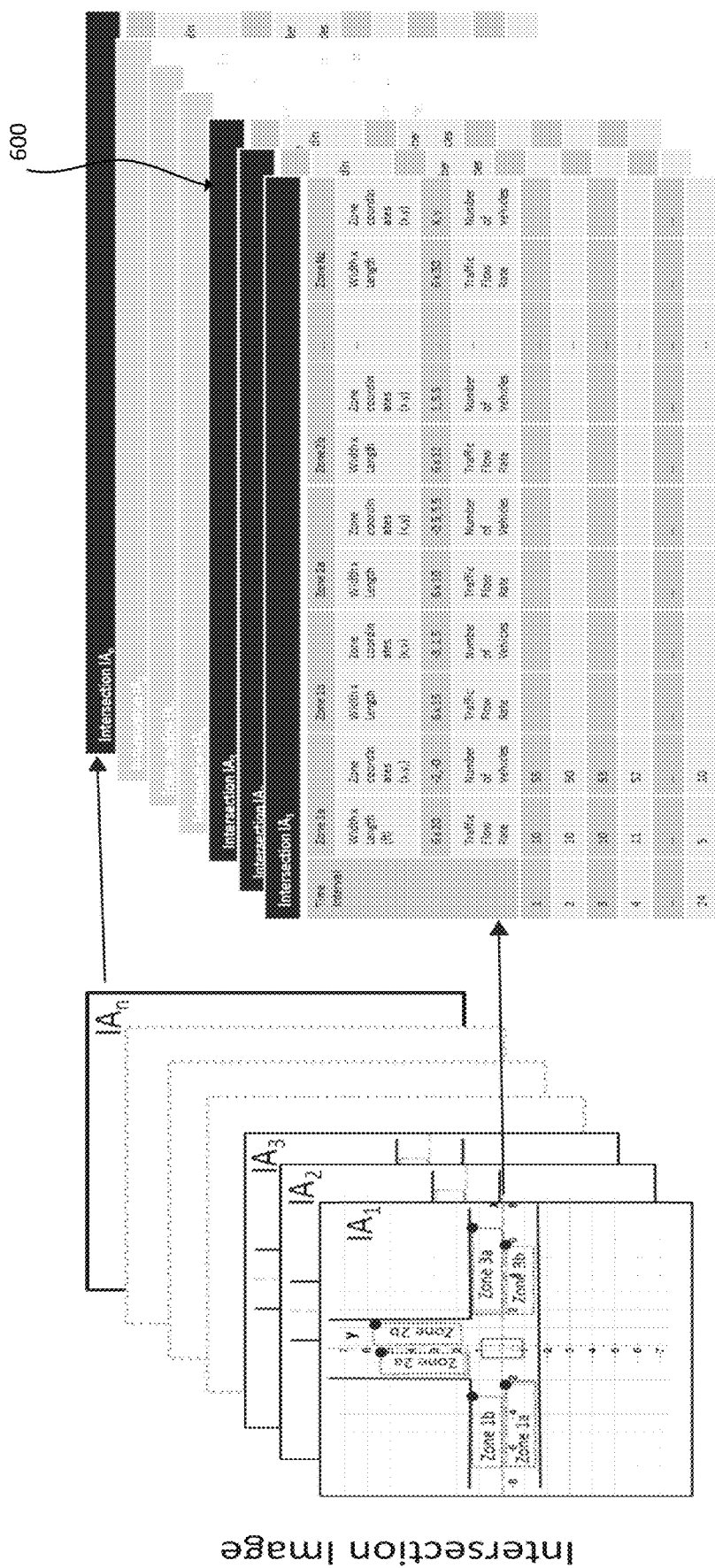

FIGS. 6A-C illustrate intersection database of FIG. 1. As mentioned above, the traffic controller 106 can store an image of an intersection together with the results of the analysis of corresponding video data in the intersection database 112. FIG. 6A illustrates that various intersections can be placed into different categories depending on the intersection type (3 way intersection, 4 way intersection, 5 way intersection, etc.).

For example, intersection 502 and its corresponding traffic analysis results are stored in intersection database under the intersection category A. As shown in FIG. 6A and over time, historical analysis results and data of each intersection can be complied and stored in the intersection database 112.

FIG. 6B illustrates historical image data of intersection category A and their corresponding analysis result stored in the intersection database 112. In comparison with the example table 500, each instance of tables 600 also includes dimensions (e.g., width and length of each of the zones 1*a*, 1*b*, 2*a*, 2*b*, 3*a* and 3*c* of the example intersection 502). Table 602 of FIG. 6C is one example of the tables 600 of FIG. 6B.

By performing the method of FIG. 4 and over time, a large database of different intersection types and corresponding relevant data (e.g., traffic flow rate, number of detected vehicles, length, width and location information of zones, etc.) is created. This large database, as will be described below, will be utilized by traffic controller 106 (implementing computer-readable instructions corresponding to learning module (service) 210) to automatically create parameters for zones.

It should be noted that the intersection database 112 not only stored data for a particular intersection over time but also across multiple (hundreds, thousands, etc.) of different intersections.

Hereinafter, examples will be described, where traffic controller 106, implementing computer-readable instructions corresponding to learning module 210 can use data stored in intersection database 112 and create zones and parameters thereof for each different zone depending on factors such as time of day, traffic flow rate, etc. As more and more data about an intersection is analysed, the traffic controller 106 can continuously increase the accuracy of zones and corresponding parameters.

Figure 7:
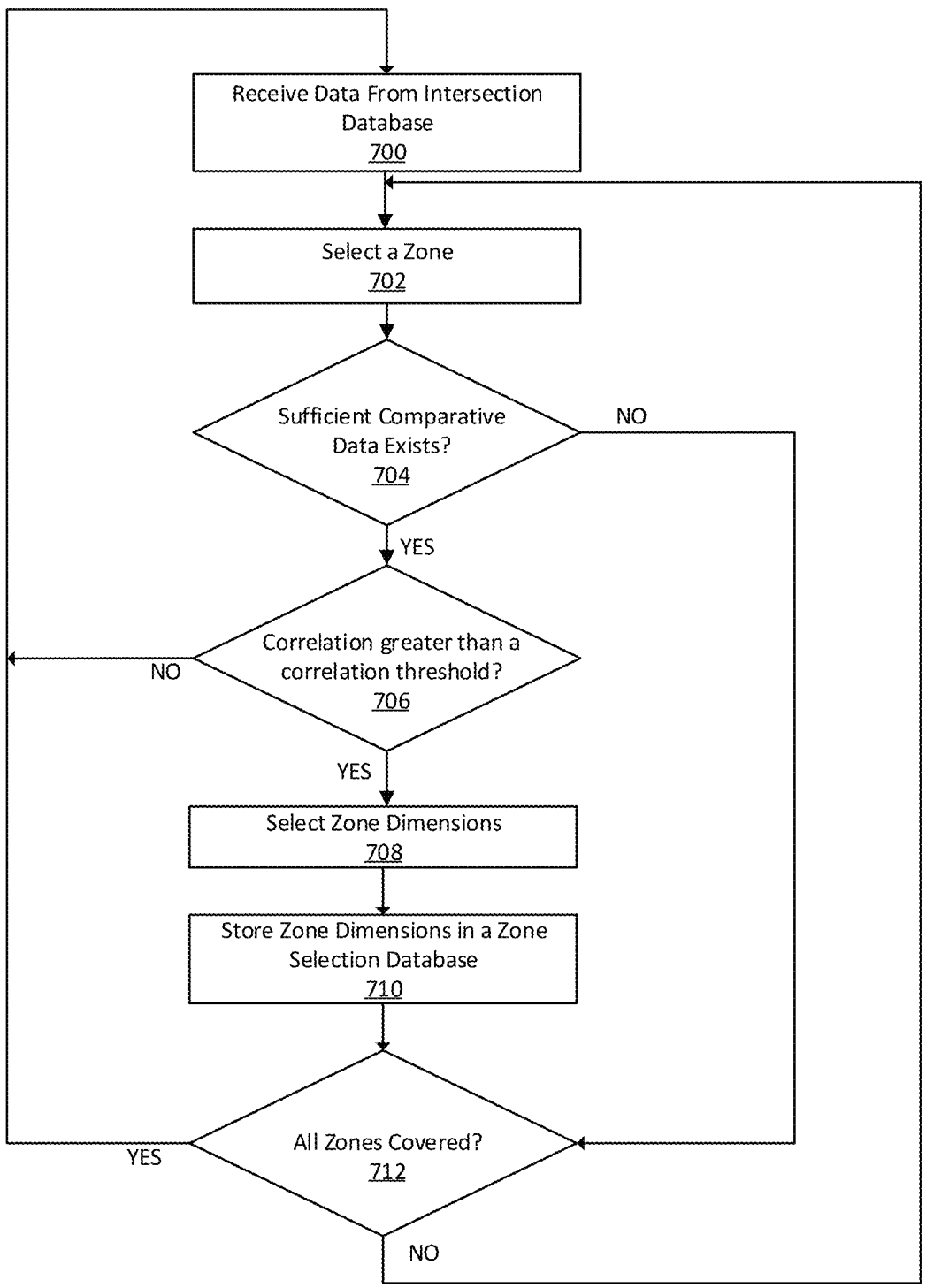
FIG. 7 illustrates a method of zone parameter creation using machine learning.

FIG. 7 illustrates a method of zone parameter creation using machine learning. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 7 will be described from the perspective of the traffic controller 106. However, it will be understood that the functionalities of the traffic controller 106 are implemented by the processor 202 executing computer-readable instructions corresponding to the learning module (service) 210 stored on the memory 206 described with reference to FIG. 2.

At step 700, the traffic controller 106 may retrieve the historical data of zones from the intersection database 112. The historical data may include locations and dimensions of zones of various intersections (organized in different intersection categories), as described above with reference to FIGS. 4-6A-C.

At step 702, and for each category of zones, the traffic controller 106 may select a zone of the matched intersections and retrieves corresponding data stored in the corresponding ones of tables 600. As mentioned above, the corresponding data can include, but is not limited to, traffic flow rates, number of vehicles, zone dimensions and locations, etc.

At step 704 and for each selected zone, the traffic controller 106 may determine if sufficient comparative data for establishing correlation between traffic flow rates and the correspond zone dimensions/locations exist. A sufficiency threshold for step 704 may be a configurable parameter determined based on empirical studies and/or experiments. This value may be set to 90%. For example, a given 3-way intersection can have zones 1*a*, 1*b*, 2*a*, 2*b*, 3*a* and 3*b*, as mentioned above. Furthermore, there may be records of 100 3-way intersections available in the intersection database 112. However, only 70 of those may have corresponding data and dimensions for zone 1*a* or 95 of them may have corresponding data for zone 2*b*. With a 90% threshold, the traffic controller 106 may skip the rest of the process of FIG. 7 for zone 1*a* as there is less than 90% comparative data available for zone 1*a* and the proceeds to step 712, to see if there are more zones to be covered. However, since there is more than 90% comparative data available for zone 2*b*, the traffic controller may proceed with the remaining steps for zone 2*b* as will be described below.

Figure 8:
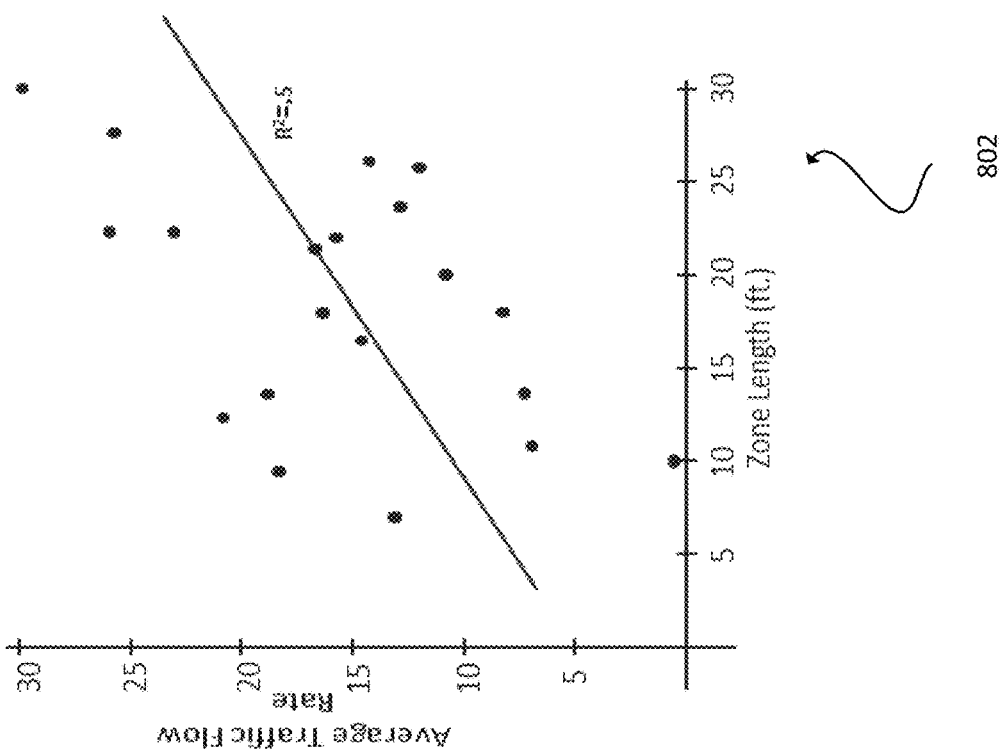
FIG. 8 illustrates two examples of correlations between number of vehicles for a given zone and the traffic flow rate.
Figure 8:
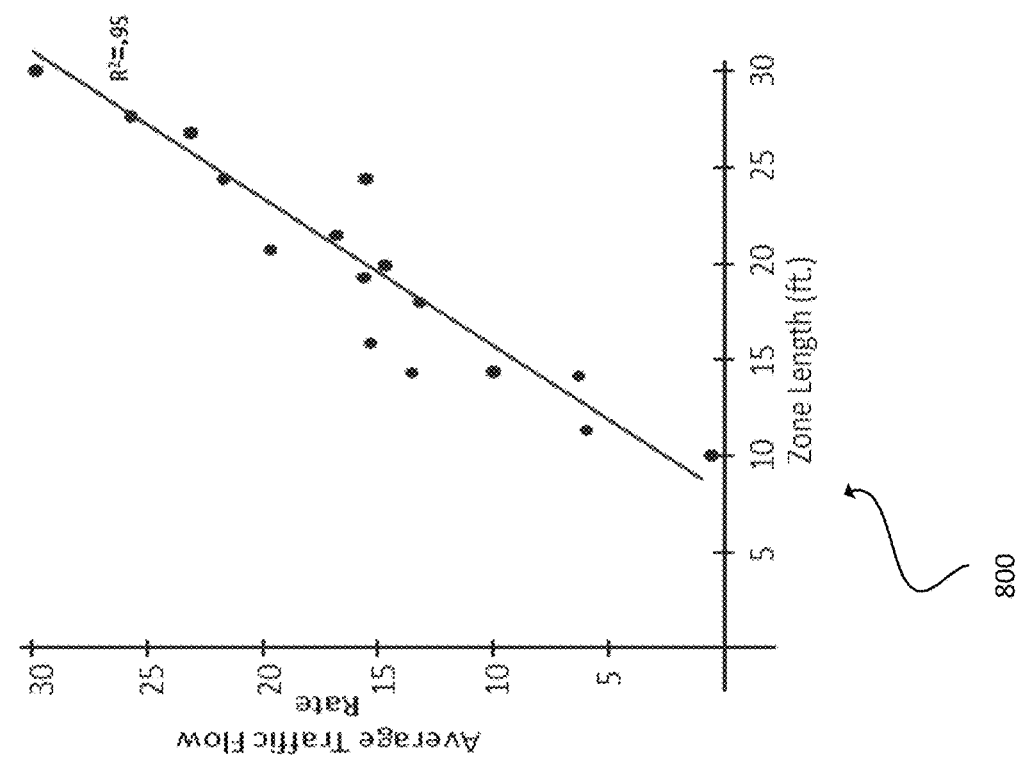

At step 706, the traffic controller 106 determines, for a given zone, if a correlation between the retrieved dimensions and the traffic flow rates and/or number of vehicles is greater than a correlation threshold. The correlation threshold may be a configurable parameter determined based on experiments and/or empirical studies. For example, the correlation threshold may be set to have a $R^2$ (R-squared) value of equal to or greater than 0.9, with $R^2$ of 1 being indicative of complete correlation and a $R^2$ value of 0 being indicative of no correlation. FIG. 8 illustrates two examples of correlations between number of vehicles for a given zone and the traffic flow rate. Graph 800 is indicative of a correlation that exceeds a correlation threshold while Graph 802 is indicative of no correlation (correlation that is less than the correlation threshold).

If at step 706, the traffic controller 106 determines that the correlation does not exceed the correlation threshold, the process returns to step 700. Otherwise, at step 708, the traffic controller 106 selects the zone dimensions (average zone dimension if more than one dimension exists for a given (a range of) traffic flow rates) as zone parameters to be associated with such traffic flow rate.

Thereafter, at step 710, the traffic controller 106 may store the selected zone parameters in the zone creation database 114. FIG. 9 illustrates an example zone parameter table stored in the zone selection database. As shown in FIG. 9, table 900 associates traffic flow rates in a given zone of an intersection category to zone parameters (dimensions and locations).

At step 712, the traffic controller 106 determines if all zones of the matched intersections at step 702 are covered. If not, the process reverts back to step 704 and the traffic controller 106 repeats steps 704, 706, 708, 710 and 712 for all zones. If all zones are covered, the process reverts back to step 700.

Accordingly, the traffic controller 106 continuously updates the zone creation database 114 by performing the process of FIG. 7. With the availability of a zone selection database and zone parameters therein, the discussion now turns to dynamic and automatic creation and updating of detection zones for a newly or existing smart traffic camera such as the smart traffic camera 103 at an intersection such as the intersection 101.

Figure 10:
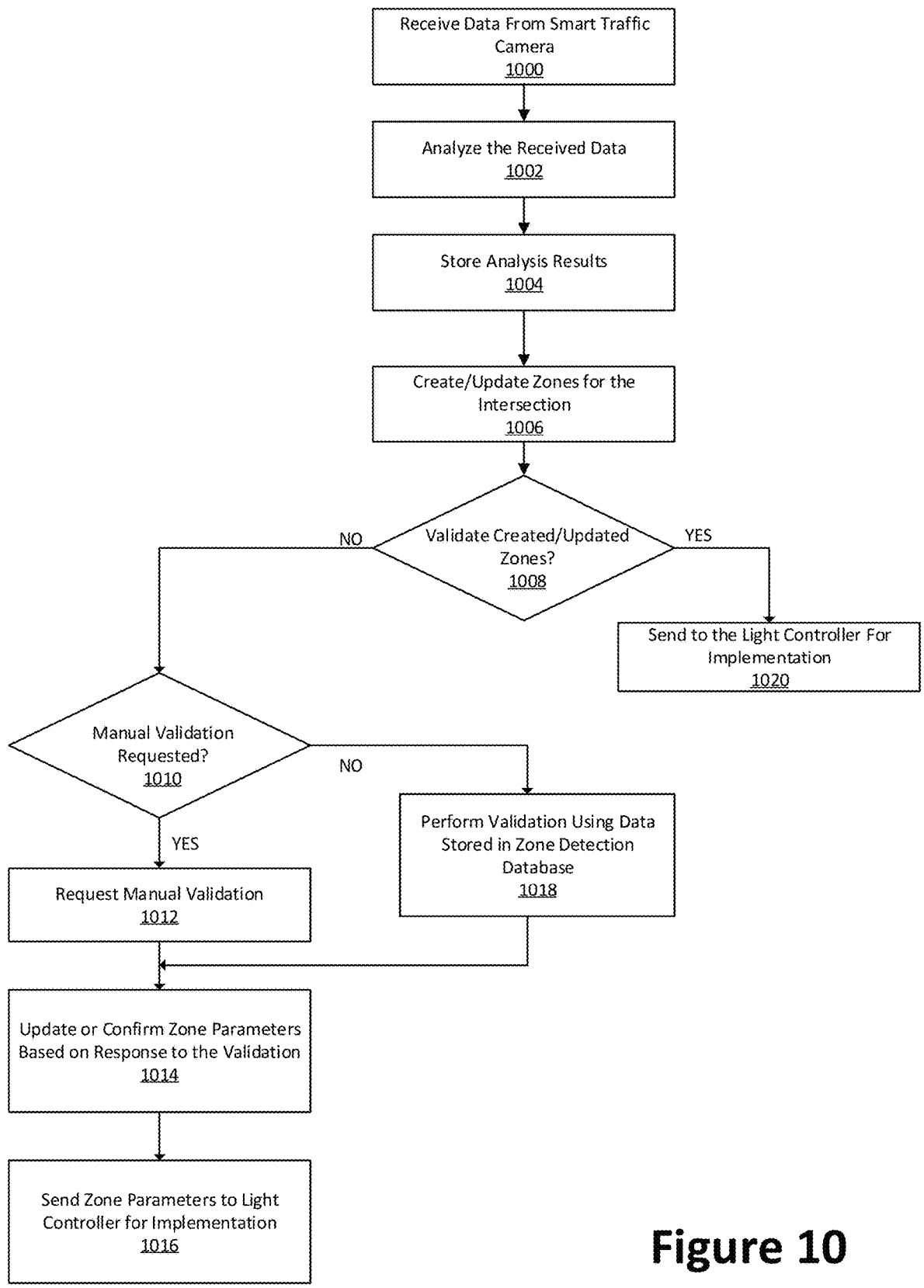
FIG. 10 illustrates an automatic creation and updating of detection zones.

FIG. 10 illustrates an automatic creation and updating of detection zones. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 10 will be described from the perspective of the light controller 102. However, it will be understood that the functionalities of the light controller 102 are implemented by the processor 302 executing computer-readable instructions corresponding to the zone creation module (service) 310 and/or user creation module (service) 314 stored on the memory 308 described with reference to FIG. 3. Alternatively, the zone creation module (service) 310 and the user creation module (service) 214 may be stored in memory 308 of light controller 102 and may be executed by processor 302 thereof.

At step 1000, the traffic controller 106 receives traffic data from the smart traffic camera 103 for the intersection 101. This smart traffic camera 103 may be a new camera with no specified zone parameters for the corresponding intersection at which it is installed or may be an existing camera with specified zone parameters.

At step 1002 and in the same manner as step 402, the traffic controller 106 analyses the received data (e.g., by implementing computer-readable instructions corresponding to tracking and ID module (service) 208) to determine various traffic data such as traffic flow rates, vehicle types, light phase and duration, etc.

The analysis results may then be stored in tracking and ID database 110 at step 1004.

At step 1006, the traffic controller 106 creates/updates zones at the intersection 101 using analysed data received from the smart traffic camera 103. The traffic controller 106 may perform the creation/updating step periodically. In one example, the creation and updating of the zones may be based on tracking movement of objects at the intersection 101, detecting stop and movement positions of objects at the intersection 101 using known or to be developed object tracking methods such as using salient point optical flow, etc.

At step 1008, the traffic controller 106 may determine if the created or updated zones and their parameters need to be validated. For example, the traffic controller 106 may determine that an initially created/updated zone needs to be continuously updated or revised or may determine that a certainly of the created/updated zones does not meet a configured threshold.

If at step 1008, the traffic controller 106 determines that validation is needed, at step 1010, the traffic controller 106 determines whether a manual validation is to be requested. This determination may be based on availability of the zone creation database 114 and/or sufficiency of zone parameters is the zone creation database 114 for intersection 101's type.

If at step 1010, the traffic controller 106 determines that manual validation is to be requested, then at step 1012, the traffic controller 106 may generate a request for manual validation and send the request to an operator via the graphical user interface 116, for example. The request may include information (can be visual) on the created/updated zones at step 1006 and can include prompts for the operator to either confirm (validate) or modify the created/updated zones and their corresponding parameters.

Based on the response to the request for manual validation, the traffic controller 106, at step 1014, determines if the originally created/updated zones remain valid or need to be updated. If any further updating is needed based on the response, the traffic controller 106 can adjust the created/updated zones and their parameters.

Thereafter, at step 1016, the traffic controller 106 can send the created zones or updated zones and their parameters to the light controller 102 to be applied to the smart traffic camera 103.

Referring back to step 1010, if the traffic controller 106 determines that no manual validation is requested, the at step 1018, the traffic controller 106 may validate the created/updates zones and corresponding parameters using data in the zone creation database 114 (stored as outputs of the machine-learning algorithm described with reference to FIG. 7). For example, the traffic controller 106 may query the zone creation database 114 to retrieve data on zones and corresponding parameters for intersections that are of the same type as the intersection 101. Upon receiving a response to the query, the traffic controller 106 can compare the retrieved zones and associated parameters to the respective ones created/updated at step 1006 and make any modifications thereto, if necessary (e.g., if a different between a created zone and associated parameters (e.g., dimensions) created at step 1006 and a corresponding zone and associated parameters retrieved from the zone creation database 114 are different by more than a threshold amount such as a threshold percentage, etc.).

Thereafter, the process reverts back to step 1014, where traffic controller 106 can perform any necessary updating of the zones created/updated at step 1006 based on the analysis performed at step 1018 using relevant data retrieved from the zone creation database 114.

Referring back to step 1008, if the traffic controller 106 determines that no validation of created/updated zones and their parameters is needed, then at step 1020, the traffic controller 106 sends the zones created/updated at step 1008 to the light controller 102 to be applied to the smart traffic camera 103.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method comprising:
    receiving traffic data at an intersection from one or more smart traffic cameras installed at the intersection;
    using on the traffic data received from the one or more smart traffic cameras installed at the intersection to create conditional zones at the intersection to be applied to the one or more smart traffic cameras installed at the intersection, wherein:
        the conditional zones are a portion of a field of view of the one or more smart traffic cameras, and
        the conditional zones filter what is processed by the one or more smart traffic cameras;
    automatically determining whether the conditional zones are to be validated;
    upon automatically determining that the conditional zones are to be validated, validating the conditional zones manually based on human feedback or automatically to create validated zones; and
    applying the validated zones to the one or more smart traffic cameras at the intersection, wherein switching from the conditional zones to the validated zones changes the portion that are processed from the one or more smart traffic cameras.

2. The method of claim 1, wherein creating the conditional zones at the intersection comprises:
    tracking objects detected at the intersection including points at the intersection at which different objects stop; and
    creating the conditional zones based on movement of the objects and the points.

3. The method of claim 2, wherein tracking the objects is based on data collected on the objects by one or more sensors installed at the intersection.

4. The method of claim 1, the method comprises:
    prior to validating the conditional zones, determining whether the conditional zones are to be validated manually based on the human feedback or automatically.

5. The method of claim 4, wherein upon determining that the conditional zones are to be validated manually, validating the conditional zones comprises:
    providing an operator a visual prompt, via graphical user interface, to one of confirm or modify the conditional zones and corresponding parameters; and
    updating the conditional zones and the corresponding parameters based on a response to the visual prompt, updated zones and corresponding parameters constituting the validated zones.

6. The method of claim 4, wherein upon determining that the conditional zones are to be validated automatically, validating the conditional zones comprises:
    querying a zone creation database to retrieve identified zones and parameters corresponding to intersections of a same type as the intersection; and
    updating the conditional zones and the corresponding parameters based on the identified zones and the parameters retrieved from the zone creation database, updated zones and corresponding parameters constituting the validated zones.

7. The method of claim 6, wherein the zone creation database stores, for each different type of intersection, corresponding zones and parameters, the corresponding zones and the parameters being constantly updated using a machine-learning algorithm operating on data collected on movement of objects at the intersection.

8. A traffic controller comprising:
    memory having computer-readable instructions stored therein; and
    one or more processors configured to execute the computer-readable instructions to:
        receive traffic data at an intersection from one or more smart traffic cameras installed at the intersection;
        use the traffic data received from the one or more smart traffic cameras installed at the intersection to create conditional zones at the intersection to be applied to the one or more smart traffic cameras installed at the intersection, wherein:
            the conditional zones are a portion of a field of view of the one or more smart traffic cameras, and
            the conditional zones filter what is processed by the one or more smart traffic cameras;
        automatically determine whether the conditional zones are to be validated;
        upon automatically determining that the conditional zones are to be validated, validate the conditional zones manually based on human feedback or automatically to create validated zones; and
        apply the validated zones to the one or more smart traffic cameras at the intersection, wherein switching from the conditional zones to the validated zones changes the portion that is processed from the one or more smart traffic cameras.

9. The traffic controller of claim 8, wherein the one or more processors are configured to execute the computer-readable instructions to create the conditional zones at the intersection by:
    tracking objects detected at the intersection including points at the intersection at which different objects stop; and
    creating the conditional zones based on movement of the objects and the points.

10. The traffic controller of claim 9, wherein tracking the objects is based on data collected on the objects by one or more sensors installed at the intersection.

11. The traffic controller of claim 8, wherein the one or more processors are further configured to execute the computer-readable instructions to:
    prior to validating the conditional zones, determining whether the conditional zones are to be validated manually based on the human feedback or automatically.

12. The traffic controller of claim 11, wherein upon determining that the conditional zones are to be validated manually, the one or more processors are configured to execute the computer-readable instructions to validate the conditional zones by:
  providing an operator a visual prompt, via graphical user interface, to one of confirm or modify the conditional zones and corresponding parameters; and
  updating the conditional zones and the corresponding parameters based on a response to the visual prompt, updated zones and corresponding parameters constituting the validated zones.

13. The traffic controller of claim 11, wherein upon determining that the conditional zones are to be validated automatically, the one or more processors are configured to execute the computer-readable instructions to validate the conditional zones by:
  querying a zone creation database to retrieve identified zones and parameters corresponding to intersections of a same type as the intersection; and
  updating the conditional zones and the corresponding parameters based on the identified zones and the parameters retrieved from the zone creation database, updated zones and corresponding parameters constituting the validated zones.

14. The traffic controller of claim 13, wherein the zone creation database is configured to store, for each different type of intersection, corresponding zones and parameters, the corresponding zones and the parameters being constantly updated using a machine-learning algorithm operating on data collected on movement of objects at the intersection.

15. One or more non-transitory computer-readable medium having computer-readable instructions, which when executed by one or more processors of a traffic controller, cause the traffic controller to:
  receive traffic data at an intersection from one or more smart traffic cameras installed at the intersection;
  use the traffic data received from the one or more smart traffic cameras installed at the intersection to create conditional zones at the intersection to be applied to the one or more smart traffic cameras installed at the intersection, wherein:
    the conditional zones are a portion of a field of view of the one or more smart traffic cameras, and
    the conditional zones filter what is processed by the one or more smart traffic cameras;
  automatically determine whether the conditional zones are to be validated;
  upon automatically determining that the conditional zones are to be validated, validate the conditional zones manually based on human feedback or automatically to create validated zones; and
  apply the validated zones to the one or more smart traffic cameras at the intersection, wherein switching from the conditional zones to the validated zones changes the portion that is processed from the one or more smart traffic cameras.

16. The one or more non-transitory computer-readable medium of claim 15, wherein the execution of the computer-readable instructions by the one or more processors causes the traffic controller to create the conditional zones at the intersection by:
  tracking objects detected at the intersection including points at the intersection at which different objects stop; and
  creating the conditional zones based on movement of the objects and the points.

17. The one or more non-transitory computer-readable medium of claim 15, wherein the execution of the computer-readable instructions by the one or more processors further causes the traffic controller to:
  prior to validating the conditional zones, determine whether the conditional zones are to be validated manually based on the human feedback or automatically.

18. The one or more non-transitory computer-readable medium of claim 17, wherein upon determining that the conditional zones are to be validated manually, the execution of the computer-readable instructions by the one or more processors causes the traffic controller to validate the conditional zones by:
  providing an operator a visual prompt, via graphical user interface, to one of confirm or modify the conditional zones and corresponding parameters; and
  updating the conditional zones and the corresponding parameters based on a response to the visual prompt, updated zones and corresponding parameters constituting the validated zones.

19. The one or more non-transitory computer-readable medium of claim 17, wherein upon determining that the conditional zones are to be validated automatically, the execution of the computer-readable instructions by the one or more processors causes the traffic controller to validate the conditional zones by:
  querying a zone creation database to retrieve identified zones and parameters corresponding to intersections of a same type as the intersection; and
  updating the conditional zones and the corresponding parameters based on the identified zones and the parameters retrieved from the zone creation database, updated zones and corresponding parameters constituting the validated zones.

20. The one or more non-transitory computer-readable medium of claim 19, wherein the zone creation database is configured to store, for each different type of intersection, corresponding zones and parameters, the corresponding zones and the parameters being constantly updated using a machine-learning algorithm operating on data collected on movement of objects at the intersection.

* * * * *